(No Model.)
J. CORNELY & J. WAGNER.
BAKER'S OVEN.
No. 258,995. Patented June 6, 1882.
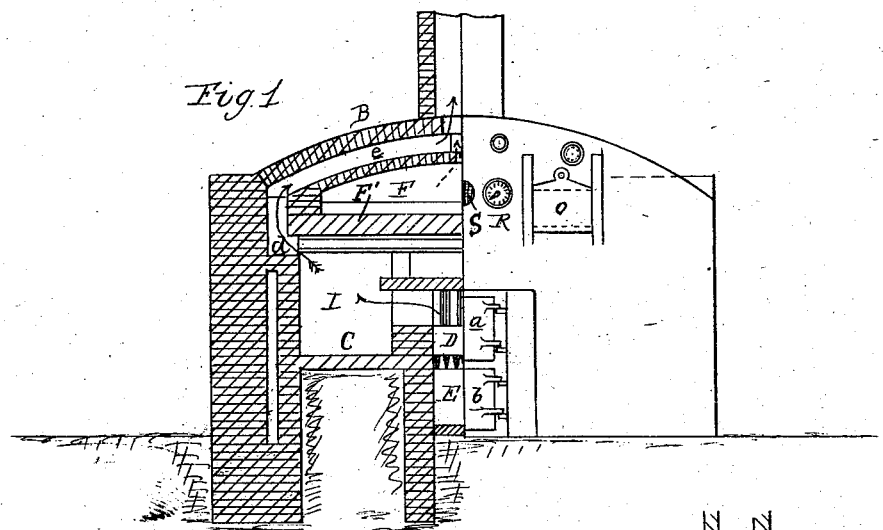
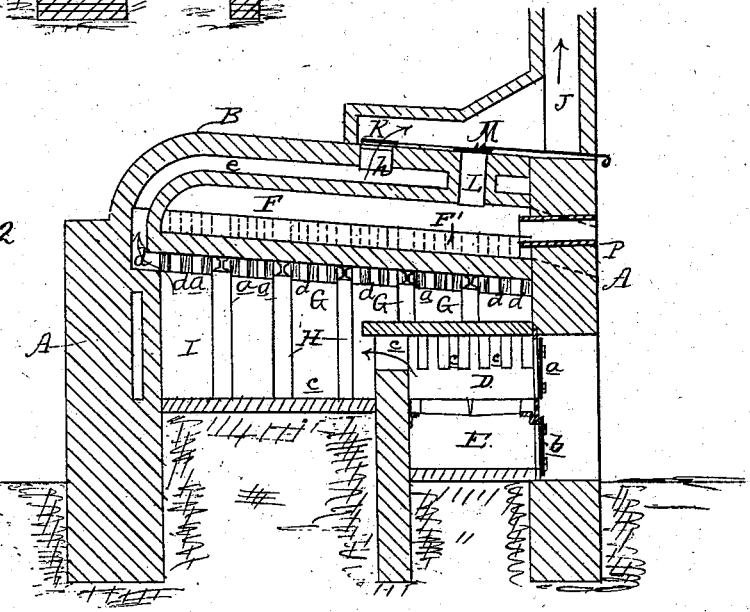
Witnesses
E. Scully
Inventors.
Joseph Cornely
John Wagner
By atty Thos. L. Sprague

UNITED STATES PATENT OFFICE.

JOSEPH CORNELY AND JOHN WAGNER, OF DETROIT, MICHIGAN.

BAKER'S OVEN.

SPECIFICATION forming part of Letters Patent No. 258,995, dated June 6, 1882.

Application filed March 23, 1882. (No model.)

*To all whom it may concern:*

Be it known that we, JOSEPH CORNELY and JOHN WAGNER, of Detroit, in the county of Wayne and State of Michigan, have invented new and useful Improvements in Bakers' Ovens; and we hereby declare that the following is a full, clear, and exact description thereof, reference being had to the accompanying drawings, which form a part of this specification.

This invention relates to certain new and useful improvements in the construction of bakers' ovens, the object of the invention being to construct an oven which may be used for all baking purposes, and thus avoiding the necessity of having different ovens for baking various kinds of bread. For instance, an oven that is adapted for baking cakes and the common so-called "cottage" or "home-made" bread, as heretofore constructed, cannot be used for baking rye or Vienna bread, which requires a quicker oven. Hence, This invention consists in the peculiar construction of an oven adapted to be used for all kinds of baking, all as more fully hereinafter set forth.

Figure 1 is a front elevation, partially in cross-section. Fig. 2 is a vertical longitudinal central section.

In the accompanying drawings, A represents the outer walls of an improved oven, provided with the arched top B, all of which are built up in the ordinary manner.

C represents the floor, which is formed of brick or other suitable material, and the space below this floor is filled up with earth.

D represents the furnace proper, below which is situated the ash-pit E, access to each being had through the doors $a$ $b$, respectively. Through the side and rear walls of the furnace are formed the openings $c$.

F represents the oven proper, supported at the sides and rear by the outer walls, while further supported by the iron girds G, which rest upon the pillars H, thus forming a chamber, I, around the furnace D beneath the oven, into which chamber I the products of combustion pass through the openings $c$ in the furnace, and from whence they pass through the openings or flues $d$ at the two sides and rear of the oven into the flue $e$ over the top of the oven, and find an exit therefrom into the chimney-flue J through the opening $h$ in the arch B, and said opening is provided with a slide-damper, K, for regulating the draft, said damper being operated by a rod from the front of the oven. An opening or flue, L, leads from the interior of the oven F into the chimney-flue, and is provided with a slide-damper, M.

The hearth F', and, in fact, the entire oven, is raised from front to rear ten inches in twelve feet, which makes the rear oven that distance above its front end, where the doors O are situated, which close the openings P in the front wall, and through which the material to be baked is introduced into the oven. These are inclined, as shown in dotted lines, Fig. 2.

A pyrometer, R, is placed in the front wall of the oven, by means of which the heat of the oven is indicated upon its dial, and the light-hole, S, covered with glass, is also provided, through which the baking may be watched.

Suitable means may be provided to facilitate the cleaning of the flues; but as these form no part of our invention we do not describe them, although we show in our drawings an opening into the flue $e$, designed to be closed by suitable plugs.

It will be observed that by elevating the rear end of the oven a so-called "steam-space" is formed above the entrance to the oven, and hence when the doors are opened the steam cannot escape from the oven unless the slide M be drawn out, so as to uncover the opening L.

By the use of an oven constructed as above described we have practically demonstrated that we are enabled to do all kinds of baking, and that we can regulate the heat of the oven more easily and with less fuel than in ovens as ordinarily constructed.

What we claim as our invention is—

In a baker's oven, the inclined hearth F', in combination with the chamber I immediately under the hearth, the furnace surrounded on three sides by and opening into the chambers I, the flues $c$, $d$, $e$, $h$, and L, and the dampers K M, substantially as and for the purpose specified.

JOSEPH CORNELY.
JOHN WAGNER.

Witnesses:
H. S. SPRAGUE,
E. SCULLY.